(No Model.)
J. P. WHITNEY.
OVEN FOR ANNEALING GLASS.
No. 477,920. Patented June 28, 1892.
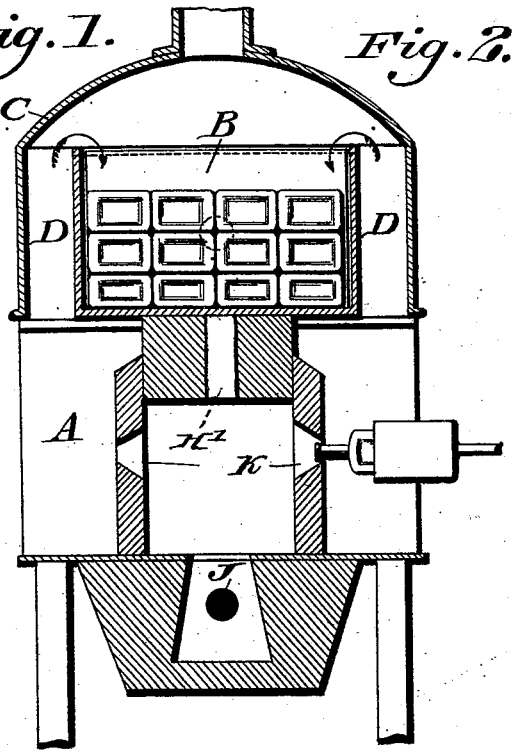
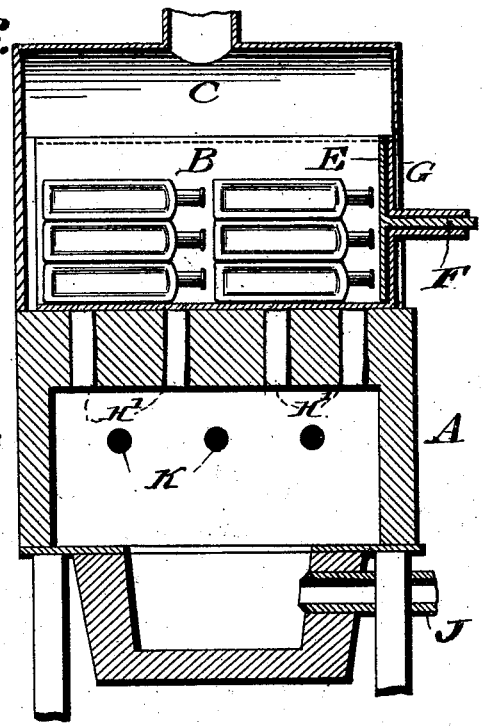
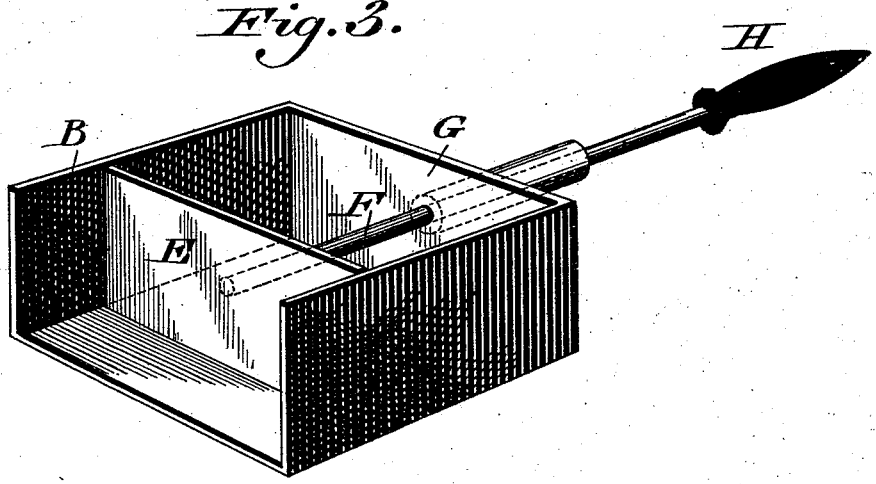
WITNESSES:
P. H. Nagle.
L. Douville.
INVENTOR
John P. Whitney
BY John A. Niederstein
ATTORNEY.

UNITED STATES PATENT OFFICE.

JOHN P. WHITNEY, OF GLASSBOROUGH, NEW JERSEY, ASSIGNOR TO THE WHITNEY GLASS WORKS, OF NEW JERSEY.

OVEN FOR ANNEALING GLASS.

SPECIFICATION forming part of Letters Patent No. 477,920, dated June 28, 1892.

Application filed January 14, 1891. Serial No. 377,748. (No model.)

*To all whom it may concern:*

Be it known that I, JOHN P. WHITNEY, a citizen of the United States, residing at Glassborough, in the county of Gloucester and State of New Jersey, have invented a new and useful Improvement in Ovens for Annealing Glass, which improvement is fully set forth in the following specification and accompanying drawings.

My invention relates to means for annealing glass or glassware; and it consists of an auxiliary oven, whereby the glass or glassware is prevented from cooling to any material extent and cracking prior to being placed in the regular annealing kilns or ovens.

Figures 1 and 2 represent vertical sections, at a right angle to each other, of an auxiliary oven for annealing glass embodying my invention. Fig. 3 represents a perspective view of a detached portion thereof.

Similar letters of reference indicate corresponding parts in the several figures.

Referring to the drawings, A designates a glass-finishing furnace, which, excepting the features of my invention applied thereto, is of well-known form and has a pipe A' for directing heating medium thereinto.

B designates a heating-tray, which is supported on the furnace A and inclosed by a hood C, between the depending sides of which and the side walls of said chamber are passages forming the flues D, which permit the ascent of heated air from the furnace to the upper part of said tray, said hood and tray forming what I term an "auxiliary oven" for temporary or intermediate purposes, to be hereinafter explained.

Within the tray B is a sliding plate E, to which is attached a rod or stem F, the latter passing through the end G of said tray and provided with a suitable handle H, whereby motions may be imparted to said plate, it being seen that the end of the tray opposite to the end G is open for the removal and insertion of said plate.

The tray B is shown as open at top, as in Fig. 3; but it is evident that the same may be provided with a cover or roof, as indicated by the dotted lines Figs. 1 and 2.

The top wall of the furnace A is provided with passages H' for conveying the hot air from the furnace to the under side of the bottom wall of the tray B, so as to more readily heat the same and the contents thereof.

The operation is as follows: When bottles or other glassware are finished in the furnace A, they are placed in the tray B until the same has a sufficient number therein, when the tray B, with its contents, is removed and presented to the regular annealing kiln or oven. Motion is then imparted to the plate E and the articles are pushed into said kiln or oven in order to be annealed.

It will be seen that I avoid material cooling of the articles and cracking of the same, the same being an objectionable feature in the art as heretofore practiced, where each article is directly conveyed from the finishing-furnace to the annealing-oven and there is a considerable loss of heat.

Having thus described my invention, what I claim as new, and desire to secure by Letters Patent, is—

1. A glass-furnace having a tray open at top, and a hood surrounding said tray and having air-passages between it and the sides of said tray leading into the open top of said tray, said tray and hood being located above the furnace and extending beyond the sides of said furnace, and the parts combined substantially as described.

2. A furnace having above the same a tray open at top and at one end and provided with a slide, substantially as described.

3. A furnace, a tray open at top and at one end, a hood above said tray having depending sides forming air-passages between it and the sides of the tray, and a slide in said tray, said parts being combined substantially as described.

JOHN P. WHITNEY.

Witnesses:
JOHN A. WIEDERSHEIM,
A. P. JENNINGS.